Patented Dec. 10, 1935

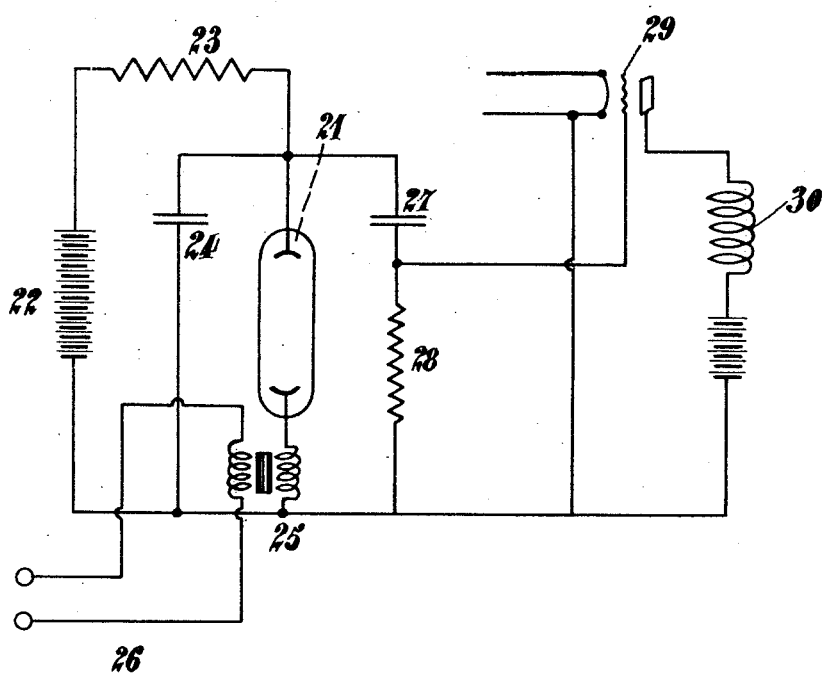

2,023,505

UNITED STATES PATENT OFFICE 2,023,505

SYNCHRONOUS DEVICE

René Barthelemy, Fontenay-Aux-Roses, France, assignor to Compagnie pour la Fabrication des Compteurs et Materiel d'Usines a Gaz, Montrouge, France, a joint-stock company of France Application December 20, 1929, Serial No. 415,537
In France December 27, 1928

2 Claims. (Cl. 178—69.5)

The present invention relates to improvements in synchronizing devices utilized in television, telephotography and telemechanics.

The majority of synchronized systems controlled at a distance either by wire or hertzian waves, call for the combination of a direct current motor coupled to an alternating current motor.

The purpose of the first is to overcome friction and to bring up the speed to the neighbourhood of synchronism, the second receives the alternating current of synchronism and gives exact speed and the phase required.

One object of the present device is to provide a simplified synchronized electric motor in which an oscillator adjusted to operate in the vicinity of the initiation of self oscillation is arranged to impress timed impulses upon the electric motor for synchronizing the motor.

Another object of my invention is to provide an electrical timing circuit arranged between an oscillator and the winding of a motor for predetermining the period of energization of the motor.

Another object of the present invention is to do away with the direct current supply for the synchronized motor.

This object is achieved by sending out short current impulses on the alternating current side and providing a local oscillator acted on by said short current impulses to produce longer impulses which release a considerable quantity of energy for driving said electric motor.

Another object of the present invention is to constitute the aforementioned oscillator by means of a vacuum or electric discharge tube filled with rarefied gas and to which a condenser is adapted to discharge, the variations of voltage produced at the terminals of this tube being transmitted to an amplifying valve connected to the synchronized motor and driving the same.

These and other objects of the present invention will become more apparent from the ensuing detailed description taken in conjunction with the accompanying drawing which illustrates a device for driving the synchronized motor by means of alternating current impulses according to my invention.

Attempts have been made heretofore to use comparatively high frequencies, for example of the order of 500, to secure extreme accuracy in the phase of rotation of a motor, for the use of currents at 15 or 20 cycles (one cycle per revolution of the motor) presents drawbacks both with regard to the accuracy and facility of amplification and, in the case of the application to television, in regard to the blurred effect of the images at the receiving end if only a single carrier wave can be utilized.

The use of high frequencies does not solve the question entirely, for in addition to the trickiness of synchronizing, a doubt still remains with regard to the phase of rotation of the motor, which can only be removed by using simultaneously low frequency synchronism. This combination has been expressed as synchronism in two dimensions.

The principle upon which the present invention is based is as follows:

In the application to television, an impulse which is very brief but considerably stronger than the television signals is sent out after each exploration or fractional exploration of the image to be transmitted (for example the emission is arrested for a millionth of a second after each rotation of the motor). This current impulse starts an impulse of longer duration at the receiving end in a suitable local oscillator (such duration being however smaller than one revolution of the motor), said impulse acting on the torque applied to the motor or to the oscillating system at the receiving end, and thus ensuring a precise relationship between the emission of the top of synchronism and the phase of the motor at the receiving station.

It is possible to carry out this method mechanically, but a simpler and more reliable method consists in using the instantaneous excess voltage to cause a condenser to discharge into a vacuum tube (for example a tube filled with neon), said discharge lasting a fraction of the time taken by the motor to perform one revolution and the currents created during these few hundredths of a second act directly or indirectly on the motor. Depending upon the instant at which this action is produced, the motor torque may be increased or diminished. By thus acting on the phase of rotation of the motor, a state of equilibrium is reached. Other things being equal, said phase will only depend on the times of emission of the synchronizing impulses. The local oscillator is thus constituted by a relaxation oscillator adjusted fairly remote from its working conditions. There is thus applied to the motor shaft a synchronizing torque which may be of considerable magnitude and the period and phase of which are controlled with great accuracy by the sending station which is only called upon to supply a very small fraction of its energy while almost the whole time of emission is occupied in sending television signals.

The accompanying drawing illustrates one practical embodiment of the system of my invention. Use is made of a neon tube 21 which possesses the known property of lighting up at the voltage $v^1$ and of being extinguished at the voltage $v^2$, the latter being considerably smaller than $v^1$. A voltage V supplied by a battery 22 is applied to the terminals of the tube 21, the voltage V generally lying between $v^1$ and $v^2$ (under certain conditions, it might however be greater than $v^1$). A resistance 23 is inserted between the battery 22 and the tube 21. A condenser 24 is shunted across said tube. A low impedance transformer 25 has its primary connected in the synchronizing circuit 26 and its secondary is mounted in the tube circuit. Under the effect of a sufficient impulse transmitted by the sending station, and if the connections are suitably made, the voltage supplied by the secondary of the transformer 25 is added to the voltage of the condenser 24 and the tube lights up. The constants of the elements 23 and 24 are such that the time during which the tube is lit up does not exceed three hundredths of a second, the duration of one rotation of the motor is six hundredths of a second and the time of recharge of the condenser 24 is of the same order of three hundredths of a second; moreover, slight departures from these times will in nowise affect the operation. Hence, there flows in a branch circuit comprising a condenser 27 and resistance 28, alternating current which enables voltage variations reproducing those existing at the terminals of the tube to be applied to the grid of an amplifying valve 29. The plate circuit current of said valve flows through the winding 30 of the motor to be synchronized and the value of the amplitude of the current oscillations will be independent of the power and of the form of the synchronizing impulses, while the sole condition which the latter have to observe is to produce the excess lighting voltage at the right moments.

For certain values of the fixed polarizations of the grid, and with the speeds of the motor adjusted beforehand to slightly above the synchronous speed, synchronizing may be accomplished and the phase set automatically by sending short rhythmic signals.

Obviously, alternatives may be introduced without departing from the spirit of the invention; thus by using a high voltage V, the neon tube might act as a continuous relaxation oscillator. The elements 23 and 24 would be designed so as to make the period of said oscillator a little longer than that of the signals. The latter would cause the oscillation to be started somewhat prematurely, but it would be renewed at the same frequency as the signals.

I claim:

1. In a device for synchronizing electric motors for television apparatus, the combination of an oscillator including an input and an output circuit, said oscillator being adjusted to operate in the vicinity of the initiation of self-oscillation, means for impressing on the input circuit of said oscillator very short rhythmic current impulses, said oscillator having a natural frequency substantially equal to the frequency of renewal of said short impulses, and means for converting said short current impulses into long current impulses emitted in the output circuit of said oscillator, a television motor, and means for applying said long current impulses successively to said television motor.

2. In a synchronizing system for television motors, means for receiving a series of short rhythmic impulses, a translating circuit including a first condenser and a first resistance disposed in series with a source of potential, a glow discharge tube adapted to be energized by the sum of the potential across said condenser and the potential supplied by a received impulse, and a circuit including a second condenser and a second resistance connected in parallel with said glow discharge tube, an amplifier having an input circuit connected across said second resistance, and a television motor connected in the output circuit of said amplifier for receiving amplified impulses discharged across said first condenser.

RENÉ BARTHELEMY.